(12) United States Patent
Marko et al.

(10) Patent No.: US 6,325,584 B1
(45) Date of Patent: *Dec. 4, 2001

(54) SELF-PIERCING RIVET

(75) Inventors: Ingobert Marko, Nürnberg; Wolfgang Thomala, Rednitzhembach; Hans-Günther Haldenwanger; Harald Kudliczka, both of Ingolstadt; Géorg Schmid, Dinkelshausen, all of (DE)

(73) Assignees: Richard Bergner GmbH, Schwabach; Audi AG, Ingolstadt, both of (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,550

(22) Filed: Mar. 30, 1999

(51) Int. Cl.[7] ............................. F16B 19/08; F16B 37/04
(52) U.S. Cl. ........................... 411/501; 411/179; 411/448
(58) Field of Search ......................... 411/179, 358, 411/359, 447, 448, 500, 501, 502

(56) References Cited

U.S. PATENT DOCUMENTS

| | | | |
|---|---|---|---|
| 371,884 | * | 10/1887 | Gaylord ............................ 411/501 X |
| 2,096,598 | * | 10/1937 | Sheane .................................. 411/501 |
| 2,465,534 | * | 3/1949 | Havener ........................... 411/501 X |
| 4,146,118 | * | 3/1979 | Zankl ................................ 411/501 X |
| 4,221,041 | * | 9/1980 | Hufnagl et al. ................... 411/501 X |
| 4,430,034 | * | 2/1984 | Fujikawa ............................... 411/179 |

FOREIGN PATENT DOCUMENTS

| | | |
|---|---|---|
| 21 55 513 | 5/1972 | (DE) . |
| 39 42 482 | 1/1991 | (DE) . |
| 44 19 065 | 12/1995 | (DE) . |
| 216 045 | 8/1986 | (EP) . |

OTHER PUBLICATIONS

Hans Peter Liebig et al., "Stanzneiten fügt umformend ohne Vorlochen der Bleche," Bänder Bleche Rohre 4 (1993), pp. 46–55.

Lothar Budde et al., "Weiterentwicklung der Stanzniettechnik," Blech Rohre Profile 39 (1992), pp. 310–314.

Ortwin Hahn et al., "Stanznieten oberflächen–veredelter Stahlbleche," Blech Rohre Profile 42 (1995), pp. 100–107.

Lothar Budde et al., "Stanznieten ist zukunftträchtig in der Blechverarbeitung," Bänder Bleche Rohre 5 (1991), pp. 94–100.

Excerpt from "Engineering" magazine (September 1982), pp. 364–365.

* cited by examiner

*Primary Examiner*—Neill Wilson
(74) *Attorney, Agent, or Firm*—Venable; George H. Spencer; Allen Wood

(57) ABSTRACT

A partially-hollow rivet (1), for joining aluminum sheets (3) and (7) by using the self-piercing technique, is made of light metal such as aluminum or an aluminum alloy, and the front (2) of the rivet base has a surface with a blunt shape.

6 Claims, 3 Drawing Sheets

SELF-PIERCING RIVET

CROSS REFERENCE TO RELATED APPLICATION

This application corresponds to EP 0,833,063 A1, published on Apr. 1, 1998, the subject matter of which is incorporated herein by reference.

BACKGROUND OF THE INVENTION

The invention relates to a supplementary joining means for joining sheet metal pieces, particularly those made of light metal. Light metals are defined, for example, in "BROCKHAUS—NATURWISSSENSCHAFTEN UND TECHNIK" [Brockhaus Encyclopedia for Natural Sciences and Technology], Volume 3, Wiesbaden 1983, p. 164 (ISBN 3-7653-0357-7).

The technique of joining two or more metal sheets permanently by means of self-piercing riveting is known. The self-piercing riveting technique is disclosed, for example, in an article by Lothar Budde et al., "Stanznieten ist zukunftstrǎchtig in der Blechverarbeitung" [Self-Piercing Riveting has a Promising Future in Sheet Metal Processing] from "Bänder Bleche Rohre" [Fasteners, Sheet Metals, Pipes], Issue 5, 1991, p. 94 ff.

This publication by Lothar Budde et alia in particular discloses that the supplementary joining means are designed either as solid rivets or as partially-hollow rivets (page 95). The present invention relates to a supplementary joining means in the form of a partially-hollow rivet. According to the description in the Lothar Budde et alia publication, the self-piercing rivet is initially pushed in an uninterrupted joining operation through the sheet on the side of the upper die during the self-piercing operation. For a self-piercing riveting of several layers, the rivet is also pushed through additional sheets and is plastically deformed in the sheet on the die-plate side. In the process, the partially-hollow rivet is provided with its closing head in that a collar is formed in the plastically deformed material of the parts to be riveted together. The pieces punched out during the punching operation in this case remain inside the shank of the partially-hollow rivet.

The joining of metal sheets with self-piercing rivets is known, in particular, from an article by Ortwin Hahn et al., "Stanznieten oberflächenveredelter Stahlbleche" [Self-Piercing Riveting of Surface-Coated Steel Sheets] in BLECH ROHRE PROFILE [Sheet Metal, Pipes and Profiles], Volume 42, 1995, p. 100 ff.

On page 100, the Ortwin Hahn et alia publication initially refers to the fact that during the self-piercing riveting, during the cropping operation, the partially-hollow rivet initially acts as a one-way punch on the sheet facing the upper die. Subsequently, the partially-hollow rivet, together with the sheet on the die-plate side, forms a closing head through plastic deformation. Thus, the partially-hollow rivet consequently must be suitable for initially punching through the sheet metal on the upper die side and must subsequently deform plastically in the sheet metal on the die-plate side.

Pages 103–106 of the publication by Ortwin Hahn et alia in particular contain a description, among other things, of the use of partially-hollow rivets for self-piercing riveting. This description refers to the fact that a partially-hollow rivet with a non-defined rivet base geometry was initially selected, e.g. referred to as "Type I" in the text. A first optimizing stage, referred to as "Type II," teaches the person skilled in the art to provide a defined rivet base geometry for the partially-hollow rivet. The authors of the Ortwin Hahn et alia publication view the Type III partially-hollow rivet as a second optimizing stage for the partially-hollow rivet, which provides for rounded edges in the region of the rivet head (page 105) in addition to the defined rivet base geometry.

In another publication by Lothar Budde et al., entitled: "Weiterentwicklung der Stanzniettechnik" [Advancements in the Self-Piercing Riveting Method], from BLECH, ROHRE, PROFILE [Sheets, Pipes, Profiles] Issue 39, 1992, p. 310 ff, a partially-hollow rivet with a defined rivet base geometry is disclosed, on page 312, FIG. 7. In order to improve the cutting behavior of the self-piercing rivet, it follows from FIG. 7 as well as the associated text that the authors consider it advantageous if the rivet base is chamfered with an angle of 60°. An inside chamfer with an angle of 60° is viewed as particularly advantageous. This coincides with the information provided in FIG. 13 of the publication by Ortwin Hahn et alia, which shows the first optimizing stage (Type II) and the second optimizing stage (Type III) of the partially-hollow rivet. Both optimizing stages also show partially-hollow rivets with an inside chamfer, provided with the reference $\alpha$.

The last-named publication by Lothar Budde et alia, from the year 1992, in particular deals with the joining of aluminum sheets. It follows from all previously mentioned publications, and in particular from the last-named publication by Lothar Budde et alia (right column on page 311 there), that self-piercing rivets as well as die-plates are used for joining aluminum sheets, which match those used for joining steel sheets with the same thickness. Partially-hollow rivets made of steel and having an inside chamfer with a chamfer angle of 60° at the rivet base are considered particularly advantageous.

The known steel partially-hollow rivets distinguish themselves through an extremely high tensile strength in the range of approximately 1200 to 1400 N/mm$^2$. Owing to this high tensile strength, it is also possible to join two sheets by means of self-piercing rivets by using the sharp, ring-shaped cutter of a steel partially-hollow rivet and an adjoining rivet shank with thin wall thickness.

However, the disadvantage when using partially-hollow rivets for joining light metal sheets, particularly aluminum or aluminum alloy sheets, is the much higher inherent weight of the self-piercing rivet made of steel, as compared to the light metals. This higher weight of the self-piercing rivets made of steel is based on the much higher density of ferrous metals as compared to non-ferrous metals, in particular light metals. The use of aluminum sheets is on the rise, primarily in the area of motor vehicle technology and especially for the vehicle body design, in order to reduce the dead weight of the vehicle body. A reduction in the dead weight of the vehicle body will have so-called secondary effects since the weight of other motor vehicle components can also be optimized as a result of the lower vehicle body weight and thus also the lower total weight, e.g. the brakes, the steering mechanism and all its components, and the wheels. Owing to the trend of using light metal sheets, particularly aluminum sheets, in the vehicle body construction in order to reduce the weight, there is an increasingly higher demand for weight-reducing supplementary joining means, meaning partially-hollow rivets made of light metal.

The use of traditional self-piercing rivets made of steel for joining light metal sheets, particularly aluminum sheets, furthermore has disadvantages because of the different electrochemical potentials of steel on the one hand and aluminum on the other. It is unavoidable that these electrochemical potential differences lead to contact corrosion when aluminum sheets are joined with steel self-piercing rivets. In order to avoid contact corrosion, to be sure, it is known from the first-named publication by Lothar Budde et alia, from the year 1991 (page 96 therein), to provide the riveting elements with a surface coating, the application of which is involved and thus expensive. However, from a production technological point of view it is desirable—because it is easier—to be able to use sheets and joining means with similar electrochemical potential, so that the involved and costly surface coating can be omitted.

Finally, when using supplementary joining means and sheets made of different materials, it is more difficult to recycle parts joined in this way. For example, a very involved process is required to separate the steel material from the aluminum material when reprocessing scrap material from vehicle bodies, for which aluminum sheets were used on the one hand and steel self-piercing rivets on the other, before the steel and the aluminum can be separated either for recycling or disposal.

SUMMARY OF THE INVENTION

Starting with these problems and the prior art present above, it is the object of the present invention to create a supplementary joining element, in particular a self-piercing rivet, for joining light metal sheets, which is improved as compared to the state of the technology.

This object is attained with a partially-hollow which is made of light metal and which has a blunt rivet base. The invention is based on the realization that rivet geometries that have proven particularly advantageous for partially-hollow rivets made of steel are not usable for a partially-hollow rivet made of light metal. If the partially-hollow rivet geometries with a chamfered rivet base and a thin-walled rivet shank, which are considered particularly advantageous in prior art, are used for a partially-hollow rivet made of light metal, the problem arises time and again that the partially-hollow rivet made of light metal, shaped in this way, is plastically deformed during the punching operation already, without ever punching through the sheet facing the upper die. In particular, the problem of plastic deformations at the front of the rivet base during the self-piercing process occurs again and again, which is not desirable for the punching process. A plastic deformation of the rivet base to create a closing head in the light metal facing the die-plate must not occur until after the punching operation.

Experiments have shown that when a light metal is used as the material for a partially-hollow rivet, it is particularly advantageous if the rivet base is designed to be as blunt as possible. It is furthermore advantageous if the wall thickness of the rivet shank is increased as compared to steel partially-hollow rivets. Thus, the developmental path taken by the state of the art is surprisingly abandoned on purpose with this invention.

Consequently, the invention for the first time overcomes the prejudice, prevailing in prior art, that the rivet geometry must be subjected to an involved optimization in order to obtain a partially-hollow rivet with satisfactory characteristics for use on an industrial scale.

The invention additionally has made it possible for the first time and with technically simple means to make available a partially-hollow rivet of light metal that can be produced on an industrial scale.

The use of aluminum or an aluminum alloy as the material for a partially-hollow rivet according to the invention was placed in the foreground during its development. That is why this is a preferred material selection. Nevertheless, it must be assumed that the invention is suitable for all partially-hollow rivets with a tensile strength in the range of approximately 400 to 450 N/mm$^2$, that is to say, rivets made of a material with relatively low tensile strength. The rivet shank may have a simple geometry, such as cylindrical, and can therefore be produced cheaply.

The dimensions for the front width of the rivet base, meaning the wall thickness of the rivet shank near the rivet base relative to the outside diameter of the rivet base, that is to say the rivet shank diameter at the rivet base, preferably amount to between 87% and 20% of the rivet base outside diameter. A wall thickness or front width for the rivet base, having values around 15% of the rivet base outside diameter, is viewed as particularly advantageous.

Another parameter that is decisive for the usability of the light-metal partially-hollow rivets is the quotient resulting from the ratio of the depth of the hollow region or cavity in the rivets shank to the outside diameter of the rivet's base. A value around 0.6 is viewed as particularly advantageous quotient.

Thus, a partially-hollow rivet having a front width that amounts to approximately 15% of the rivet base outside diameter and a cavity depth corresponding to 0.6 times the value of the rivet base outside diameter is viewed as suitable for production on an industrial scale.

BRIEF DESCRIPTION OF THE DRAWINGS

The invention will now explained in further detail with the aid of the exemplary embodiment shown in the Figures, wherein.

DESCRIPTION OF THE PREFERRED EMBODIMENT

Figure 1:
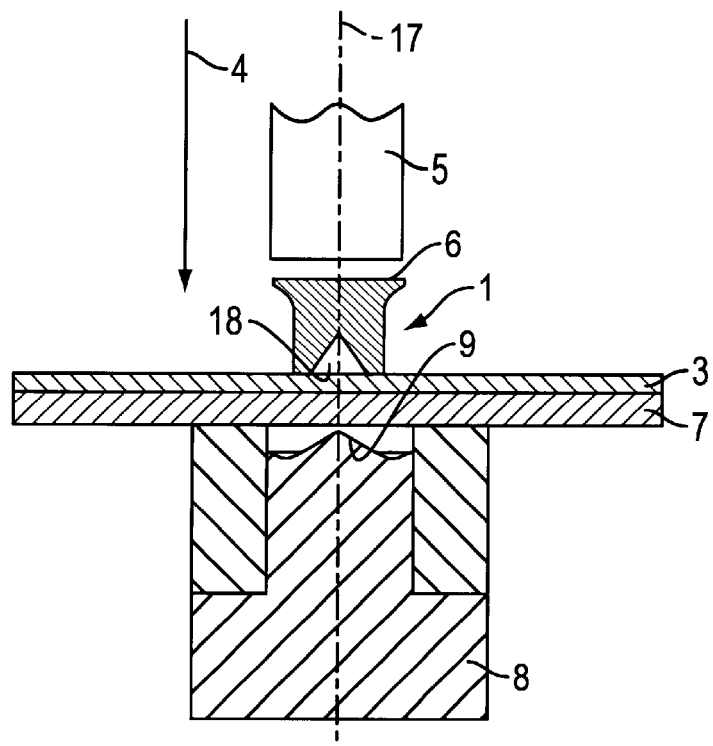
FIG. 1 is a sectional view showing a partially-hollow rivet according to the invention, which is placed onto aluminum sheets which are to be joined.

In FIG. 1, a partially-hollow rivet 1 rests with its rivet base front 2 an upper aluminum sheet 3 of a sheet metal stack. The rivet 1 is made of a light metal such as aluminum or an aluminum alloy. An upper die 5 of the self-piercing riveting device, which can be moved in a longitudinal punching direction 4, is shown in the resting position. During the riveting operation, the upper die 5 acts upon the rivet head 6.

In punching direction 4, a lower aluminum sheet 7, which forms the lower sheet of the sheet metal stack, is arranged below the upper aluminum sheet 3. The lower aluminum sheet 7 rests on a lower die 8. The lower die 8 has a die face 9.

Figure 2:
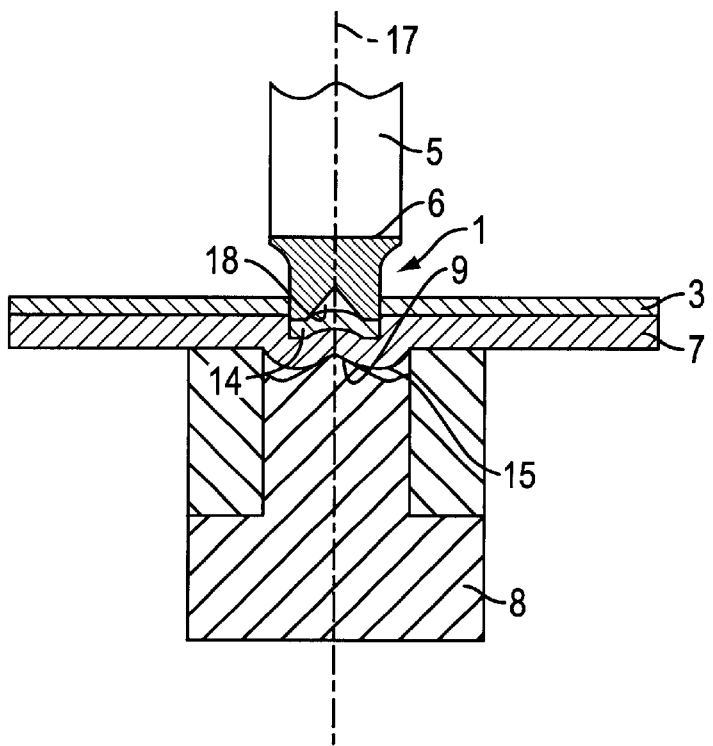
FIG. 2 is a sectional view showing the piercing (punching) of the upper sheet layer and the simultaneously starting deformation of the lower sheet layer.
Figure 3:
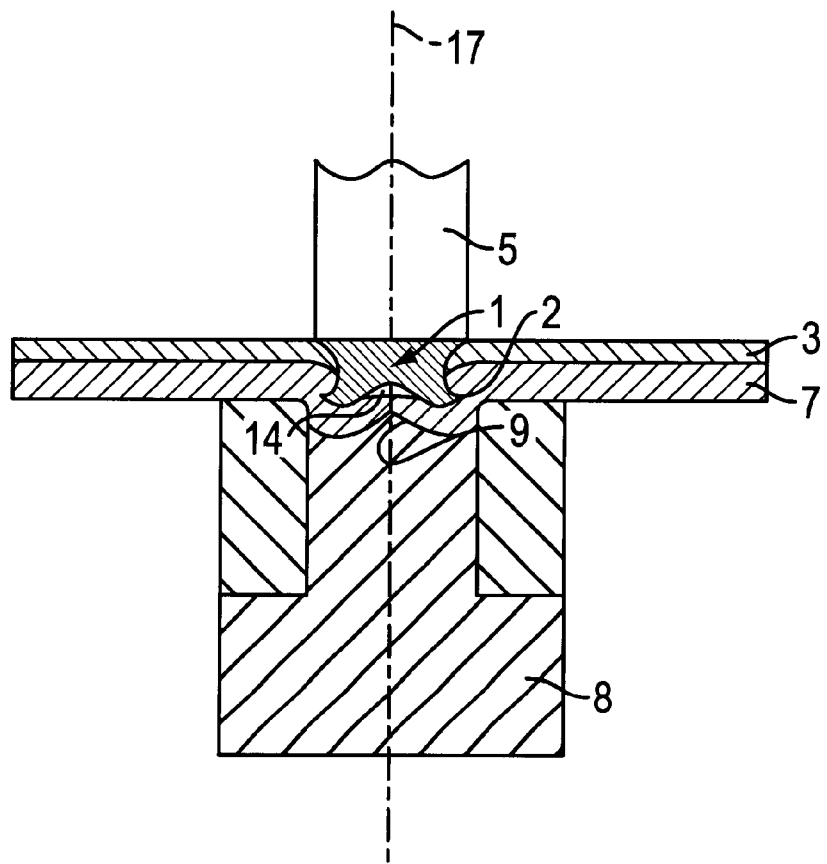
FIG. 3 is a sectional view showing the spreading out of the partially-hollow rivet together with the lower sheet layer to form a closing head.
Figure 4:
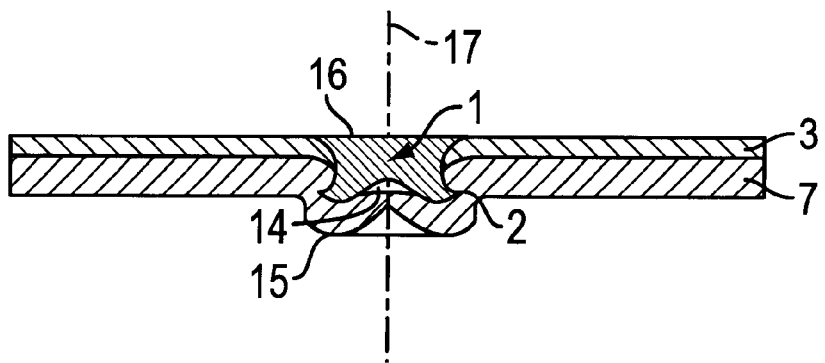
FIG. 4 is a section view showing the completed joining of the aluminum sheets with the rivet.
Figure 5:
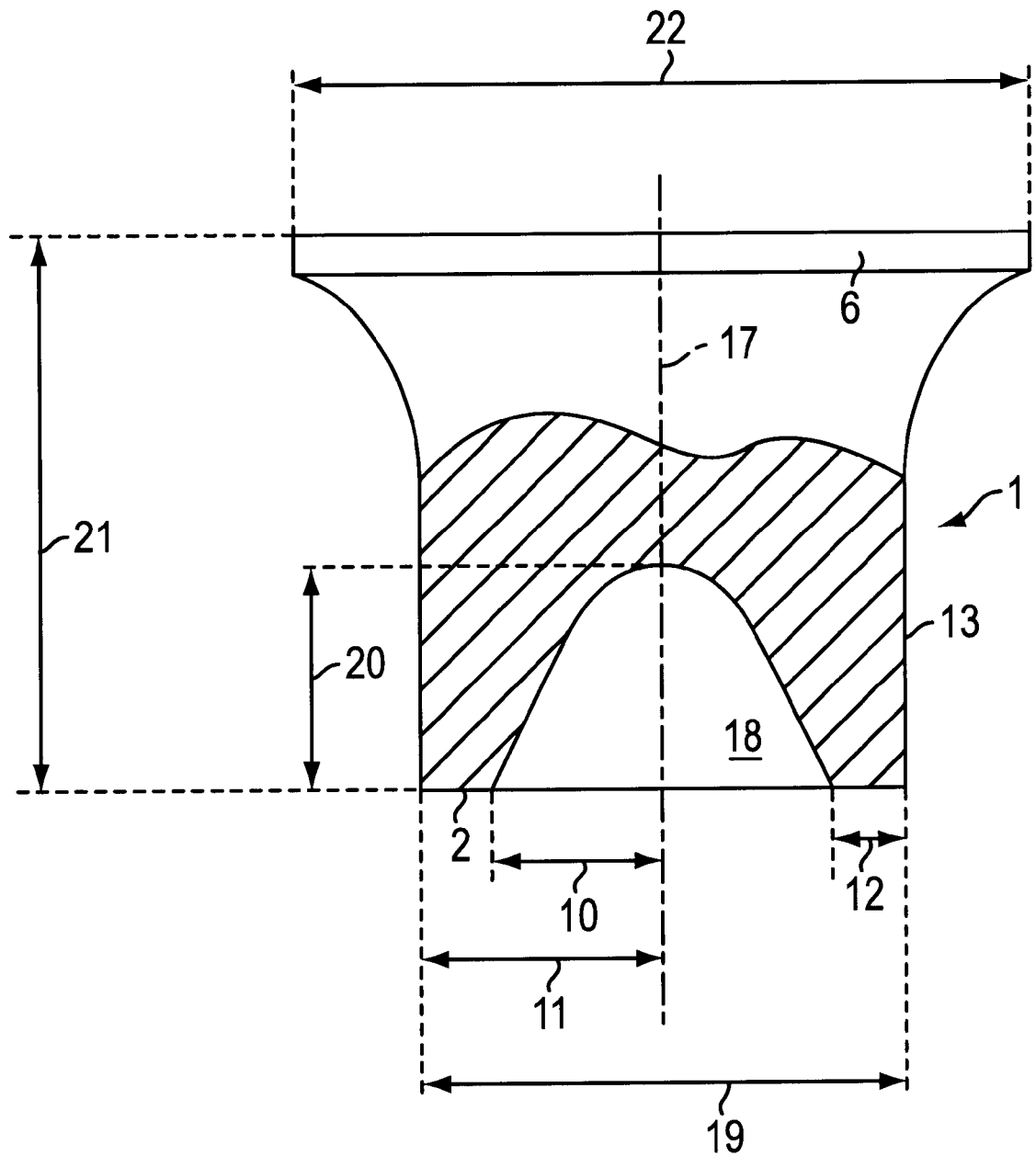
FIG. 5 shows a side view, partially cut away from the side, of the self-piercing rivet according to the invention.

When viewed from the rivet's front or lower end, the rivet base 2 is annular (circular) in shape. The width 12 (see FIG. 5) of the rivet base front 2, resulting from the difference between rivet base inside radius 10 and rivet base outside radius 11, is such that the rivet shank 13 is stable enough to pierce, that is to say punch, through the upper aluminum sheet 3 during the punching operation, e.g. as shown in FIG. 2. When punching through the upper aluminum sheet 3, a piece 14 is punched out of the upper aluminum sheet 3. When punching through the upper aluminum sheet 3, the lower aluminum sheet 7 is deformed on the die face 9 of lower die 8 by the upper die 5, which moves in punching direction 4, and forms a generally bowl-shaped closing head 15. During the self-piercing riveting, the partially-hollow rivet 1 consequently punches first through the upper aluminum sheet and then begins to spread out. During this spreading out, the rivet base claws into the material of the lower aluminum sheet 7, in the region of closing head 15. Since the lower aluminum sheet 7 is only deformed, the completed self-piercing rivet joint, shown in FIG. 4, is absolutely fluid-impermeable and gas-impermeable in the region of closing head 15. With the self-piercing rivet joint shown in FIG. 4, the region opposite the closing head 15, containing the rivet head 6 of the partially-hollow rivet 1, is referred to as the set head 16 of the rivet joint.

The partially-hollow rivet 1, shown in the embodiment, has a rotationally-symmetrical design relative to its center longitudinal axis 17. The rivet shank 13 of the partially-hollow rivet 1 according to the invention is cylinder-shaped. In the region of rivet head 6, the cylindrical outline of rivet shank 13 changes to form a section that expands like a truncated cone and has concavely curved side surfaces.

The rivet base contains a cavity 18, which expands in a cone shape toward an anger cavity mouth at the rivet base front 2. The cavity 18 opens at the annular rivet base front 2. As long as it is not deformed, the partially-hollow rivet 1 can rest on the annular surface around the cavity 18, meaning the rivet base front 2, e.g. as in the representation in FIG. 1.

A special feature according to the invention of the aluminum partially-hollow rivet is that the surface contour of the cavity mouth at the rivet base front 2 is not designed as a pointed, tapered cutting edge, but as plane, concave or convex surface, which ends in a blunt edge.

The width 12 of rivet base front 2 preferably exceeds 7% of the rivet base outside diameter 19. This dimensioning of the width 12 ensures a sufficiently large cross section for punching through the upper aluminum sheet 3. At the same time, the ring-shaped wall of partially-hollow rivet 1, formed between the cavity 18 and the outside wall of the rivet shank 13, is dimensioned in such a way that a plastic spreading of the rivet shank 13 in conjunction with the lower aluminum sheet 7 is always ensured to form the closing head 15.

The angle of taper for the cone-shaped cavity 18 preferably amounts to about 50° to 60°. For the exemplary embodiment according to FIG. 5, the angle of taper amounts to 54°.

The ratio between the depth 20 of the cavity 18 and the rivet base outside diameter 19 amounts to approximately 0.6. If the depth 20 is too short, then the rivet shank 13 of semi-tubular rivet 1 does not sufficiently spread out following the punching of the upper aluminum sheet 3. On the other hand, if the depth 20 is selected to be too long, this may adversely affect the piercing of the upper aluminum sheet 3.

The ratio for the total rivet length 21 and the depth 20 is 5:3 for the exemplary embodiment. The rivet head diameter 22 corresponds approximately to 1.5 times the value of the rivet base outside diameter 19.

The exemplary embodiment thus shows a supplemental joining element, designed as a partially-hollow rivet (1), for joining two aluminum sheets (3), (7) by using the self-piercing piercing method, wherein the partially-hollow rivet (1) is made of light metal and the front (2) of the rivet base has a blunt surface shape.

It will be understood that the above description of the present invention is susceptible to various modifications, changes, and adaptations, and the same are intended to be comprehended within the meaning and range of equivalents of the appended claims.

What we claim is:

1. A self-piercing rivet, comprising:

a rivet body made of light metal, the rivet body having a longitudinal axis and first and second ends that are spaced apart from one another along the longitudinal axis, the first end of the rivet body being configured to provide the rivet body with a blunt rivet base, the rivet body additionally having a shank between the ends, wherein the shank has an outer surface with a portion that is substantially cylindrical, the substantially cylindrical portion of the outer surface of the shank extending from the first end of the rivet body toward the second end of the rivet body, wherein the shank has a cavity that expands from a cavity bottom disposed between the first and second ends of the rivet body to an opening at the first end, the first end having an annular base front surface that extends outward from the opening to the outer surface of the shank, the rivet base front surface being substantially perpendicular to the longitudinal axis of the body, the rivet base front surface having a width, from the opening to the outer surface of the shank, in the range of about 8% to about 20% of the diameter of the substantially cylindrical portion of the outer surface of the shank, wherein the cavity has a predetermined depth, the ratio of the depth of the cavity to the diameter of the substantially cylindrical portion of the outer surface of the shank being between about 0.3 and about 0.7, and wherein the cavity has a substantially conical portion which extends from the opening at the first end of the rivet body toward the cavity bottom and which has a taper angle between about 50° and 60°.

2. A rivet according to claim 1, wherein the light metal is selected from the group consisting of aluminum and an aluminum alloy.

3. A rivet according to claim 1, wherein the rivet base front surface includes a concave surface.

4. A rivet according to claim 1, wherein the width of the rivet base front surface amounts to about 15% of the diameter of the substantially cylindrical portion of the outer surface of the shank.

5. A rivet according to claim 1, wherein the ratio of the depth of the cavity to the diameter of the substantially cylindrical portion of the outer surface of the shank is about 0.6.

6. A rivet according to claim 1, wherein:

the rivet body has a generally circular rivet head at the second end thereof, the rivet head having a diameter of about 7.75 mm;

the rivet body has total lenght of about 5 mm;

the depth of the cavity is about 3 mm;

the diameter of the substantially cylindrical portion of the outer surface of the shank is about 5.3 mm;

the width of the rivet base front surface is about 0.8 mm; and the taper angle of the substantially conical portion of the cavity is about 54°.

* * * * *